(12) United States Patent
Tsuchida et al.

(10) Patent No.: US 9,487,217 B2
(45) Date of Patent: Nov. 8, 2016

(54) COLLISION MITIGATION APPARATUS

(71) Applicants: DENSO CORPORATION, Kariya, Aichi-pref. (JP); Toyota Jidosha Kabushiki Kaisha, Toyota-shi, Aichi-ken (JP)

(72) Inventors: Norio Tsuchida, Kariya (JP); Jun Tsuchida, Toyota (JP); Masayuki Shimizu, Toyota (JP)

(73) Assignees: DENSO CORPORATION, Kariya, Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 95 days.

(21) Appl. No.: 14/282,301

(22) Filed: May 20, 2014

(65) Prior Publication Data
US 2014/0350785 A1    Nov. 27, 2014

(30) Foreign Application Priority Data
May 22, 2013    (JP) .................................. 2013-108114

(51) Int. Cl.
*B60T 8/17*    (2006.01)
*B60W 30/08*    (2012.01)
(Continued)

(52) U.S. Cl.
CPC .............. *B60W 50/00* (2013.01); *B60W 30/08* (2013.01); *B60W 30/085* (2013.01); *B60W 30/09* (2013.01);
(Continued)

(58) Field of Classification Search
CPC ..................... B60T 8/17558; B60T 2201/072; B60W 30/08; B60W 30/09; B60W 2550/10; G01S 13/93; G01S 13/931
See application file for complete search history.

(56) References Cited

U.S. PATENT DOCUMENTS 6,097,311 A    8/2000 Iwasaki et al.
2004/0199327 A1*  10/2004 Isogai ................ B60K 31/0008
                                           701/301
(Continued)

FOREIGN PATENT DOCUMENTS

JP    H08-339500    12/1996
JP    H11-144198    5/1999
(Continued)

OTHER PUBLICATIONS

Office Action dated Apr. 21, 2015, issued in the corresponding Japanese application No. 2013-108114. (in Japanese with English translation).
(Continued)

*Primary Examiner* — Yonel Beaulieu
*Assistant Examiner* — Thomas Ingram
(74) *Attorney, Agent, or Firm* — Harness, Dickey & Pierce, P.L.C.

(57) ABSTRACT

A collision mitigation apparatus is provided, which is installed in a vehicle and mitigates damage to the vehicle in occurrence of a collision. The apparatus includes an activation control section which detects an object positioned around the vehicle, and activates a collision mitigation part for mitigating damage to the vehicle in occurrence of a collision if a positional relationship between the vehicle and the object meets a predetermined activation condition, a type determining section which determines type of the object, the type being any one of a vehicle, a pedestrian and a roadside object, and an activation condition changing section which consolidates the activation condition compared to a case where the type of the object is not a roadside object, if the type of the object is a roadside object.

4 Claims, 4 Drawing Sheets

(51) Int. Cl.
*B60W 30/09* (2012.01)
*G01S 13/93* (2006.01)
*B60W 50/00* (2006.01)
*B60W 30/085* (2012.01)
*B60W 30/095* (2012.01)
*B60T 8/1755* (2006.01)

(52) U.S. Cl.
CPC ....... *B60W 30/0956* (2013.01); *B60T 8/17558* (2013.01); *B60T 2201/022* (2013.01); *B60W 2550/146* (2013.01); *G01S 13/931* (2013.01)

(56) References Cited

U.S. PATENT DOCUMENTS

| | | | | |
|---|---|---|---|---|
| 2005/0107955 | A1* | 5/2005 | Isaji | B60R 21/0134 701/301 |
| 2006/0173621 | A1* | 8/2006 | Stopczynski | B60W 30/09 701/301 |
| 2007/0286475 | A1* | 12/2007 | Sekiguchi | G06K 9/00369 382/154 |
| 2008/0269997 | A1* | 10/2008 | Ezoe | B60T 7/22 701/70 |
| 2008/0319670 | A1* | 12/2008 | Yopp | B60W 30/16 701/301 |
| 2009/0248270 | A1* | 10/2009 | Sekiguchi | B60W 10/06 701/96 |
| 2010/0052884 | A1 | 3/2010 | Zeppelin et al. | |
| 2010/0082251 | A1* | 4/2010 | Kogure | B60T 8/17558 701/301 |
| 2011/0222732 | A1 | 9/2011 | Higuchi et al. | |
| 2013/0261951 | A1* | 10/2013 | Sekiguchi | B60T 7/22 701/301 |
| 2013/0322688 | A1 | 12/2013 | Tsuchiya et al. | |
| 2014/0032093 | A1* | 1/2014 | Mills | B60W 40/107 701/301 |

FOREIGN PATENT DOCUMENTS

| | | |
|---|---|---|
| JP | 2004-220233 | 8/2004 |
| JP | 2004-259151 | 9/2004 |
| JP | 2004-355266 | 12/2004 |
| JP | 2007-099237 | 4/2007 |
| JP | 2010-500678 | 1/2010 |
| JP | 2010-072973 | 4/2010 |
| JP | 2010-003002 | 7/2010 |
| JP | 2011-051572 | 3/2011 |
| WO | 97/14584 | 4/1997 |
| WO | WO2012/115009 | 8/2012 |

OTHER PUBLICATIONS

Office Action dated Oct. 20, 2015, issued in the corresponding Japanese application No. 2013-108114. (with English translation).

* cited by examiner

COLLISION MITIGATION APPARATUS

CROSS-REFERENCE TO RELATED APPLICATION

This application is based on and claims the benefit of priority from earlier Japanese Patent Application No. 2013-108114 filed May 22, 2013, the description of which is incorporated herein by reference.

BACKGROUND

1. Technical Field

The present invention relates to a collision mitigation apparatus for vehicles, which is able to mitigate damage caused to a vehicle equipped with the apparatus when the vehicle is involved in a collision.

2. Related Art

Such a collision mitigation apparatus as set forth above uses a known technique for mitigating damage. As an example of such a technique, a patent document JP-A-2010-003002 discloses that the position of the vehicle equipped with a collision mitigation apparatus (own vehicle) is used as a basis when the own vehicle collides with an object that has been predicted to collide with. Specifically, in the technique disclosed in this patent document, the timing of starting control for mitigating damage (activation timing) is changed in accordance with the position of the own vehicle in colliding with the object.

However, in the collision mitigation apparatus as set forth above, the activation timing is uniformly set, irrespective of the type of an object that the own vehicle may collide with. For example, when the own vehicle travels along a guardrail, the control for mitigating damage is mostly unnecessary, but this unnecessary control is performed due to the uniform setting. As another example, when the object is a pedestrian, it is necessary to perform the control for mitigating damage at an earlier stage, but this necessary control is delayed due to the uniform setting.

SUMMARY

An embodiment provides a collision mitigation apparatus for vehicles which mitigates damage to a vehicle equipped with the apparatus when the vehicle is involved in a collision. The apparatus performs necessary control at an earlier stage, while suppressing unnecessary control.

As an aspect of the embodiment, a collision mitigation apparatus is provided, which is installed in a vehicle and mitigates damage to the vehicle in occurrence of a collision. The apparatus includes: an activation control section which detects an object positioned around the vehicle, and activates a collision mitigation part for mitigating damage to the vehicle in occurrence of a collision if a positional relationship between the vehicle and the object meets a predetermined activation condition; a type determining section which determines type of the object, the type being any one of a vehicle, a pedestrian and a roadside object; and an activation condition changing section which consolidates the activation condition compared to a case where the type of the object is not a roadside object, if the type of the object is a roadside object.

DETAILED DESCRIPTION OF THE PREFERRED EMBODIMENTS

With reference to the accompanying drawings, hereinafter is described an embodiment of the present invention.

(Configuration of the Embodiment)

Figure 1:
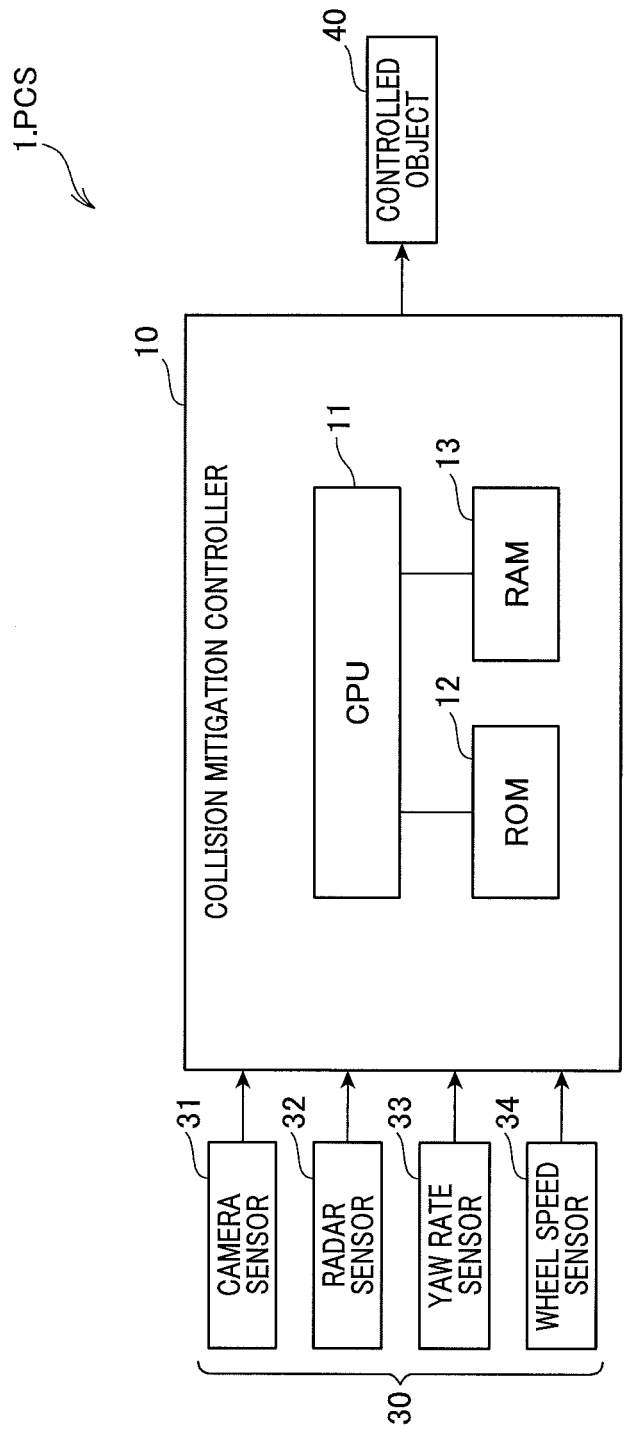
FIG. 1 is a schematic block diagram illustrating a pre-crash safety system to which the present invention is applied.

FIG. 1 is a schematic block diagram illustrating a pre-crash safety system 1. The pre-crash safety system (hereinafter referred to as PCS) 1 is installed in a vehicle, such as a passenger car, to detect the probability of the vehicle's collision, minimize the occurrence of the vehicle's collision, and mitigate damage to the vehicle in the occurrence of a collision. Hereinafter, the vehicle equipped with the PCS 1 is referred to as "the vehicle" or "the own vehicle". As shown in FIG. 1, the PCS 1 includes a collision mitigation controller 10, various sensors 30 and a controlled object 40.

For example, the various sensors 30 include a camera sensor 31, a radar sensor 32, a yaw rate sensor 33 and a wheel speed sensor 34. The camera sensor 31 is configured as a stereo camera that can detect, for example, a distance to an object. Based on a picked-up image, the camera sensor 31 recognizes the shape of an object, such as a pedestrian, an on-road obstacle or a different vehicle, in the image, and the distance to an object.

The radar sensor 32 detects an object together with its position (position relative to the own vehicle). The yaw rate sensor 33 is configured as a well-known yaw rate sensor that detects a turn angular velocity of the vehicle.

The wheel speed sensor 34 detects a rotating speed of a wheel, i.e. a traveling speed of the vehicle. The detection results of the various sensors 30 are acquired by the collision mitigation controller 10.

The camera sensor 31 and the radar sensor 32 perform detection of objects which are positioned in the traveling direction of the vehicle at a predetermined period (e.g., of 100 ms). The radar sensor 32 emits an electromagnetic wave having directivity toward an object and receives its reflected wave to obtain the position of the object as a plurality of coordinates.

The collision mitigation controller 10 is configured as a well-known computer that includes a CPU 11, ROM 12 and RAM 13. The collision mitigation controller 10 executes a program stored in the ROM 12 on the basis such as of the detection results acquired from the various sensors 30 to perform various processes, such as a collision mitigation process, which will be described later. The collision mitigation controller 10 includes an activation control section, a type determining section, an activation condition changing section, and a road shape recognizing section.

The collision mitigation controller 10 performs the various processes and activates the controlled object 40 in accordance with the results of the processes. The controlled object 40 includes an actuator for activating a brake, a steering or a seat belt, or an alarm device that raises an alarm. In the present embodiment, the description hereinafter is based on a case where the controlled object 40 is a brake.

In activating the function of each automatic brake, the CPU 11 uses a detection signal from the wheel speed sensor 34 as a basis. According to the detection signal from the wheel speed sensor 34, the CPU 11 activates the controlled object 40 such that a preset deceleration and a preset deceleration amount (speed difference between before and after activating the automatic brake) are achieved.

(Process Performed in the Present Embodiment)

Figure 2:
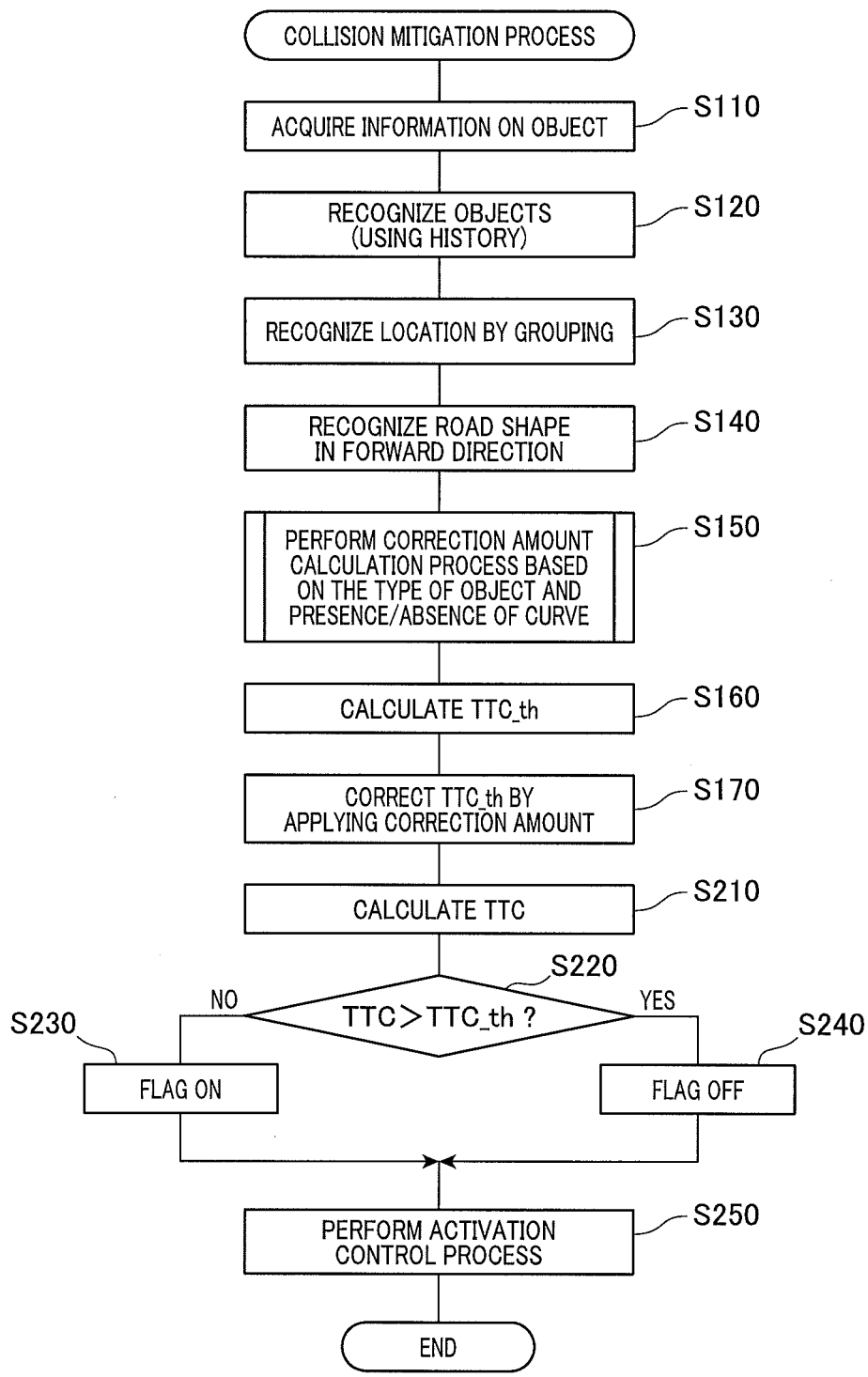
FIG. 2 is a flow diagram illustrating a collision mitigation process performed by a CPU of a collision mitigation controller.
Figure 3:
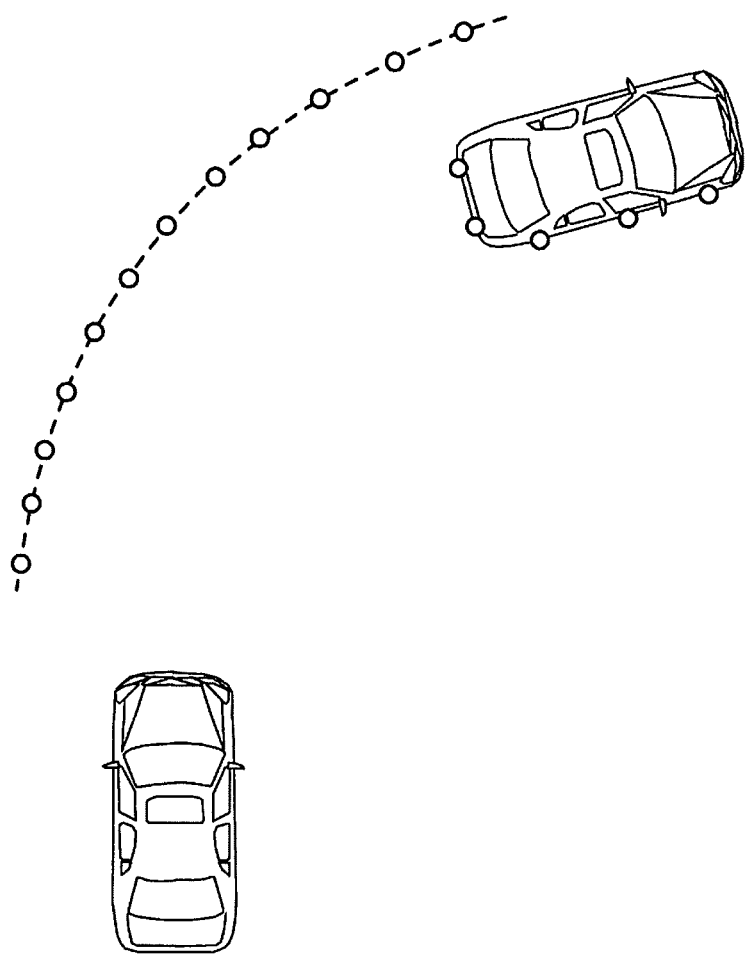
FIG. 3 is an explanatory diagram illustrating a method of identifying the type of an object.
Figure 4:
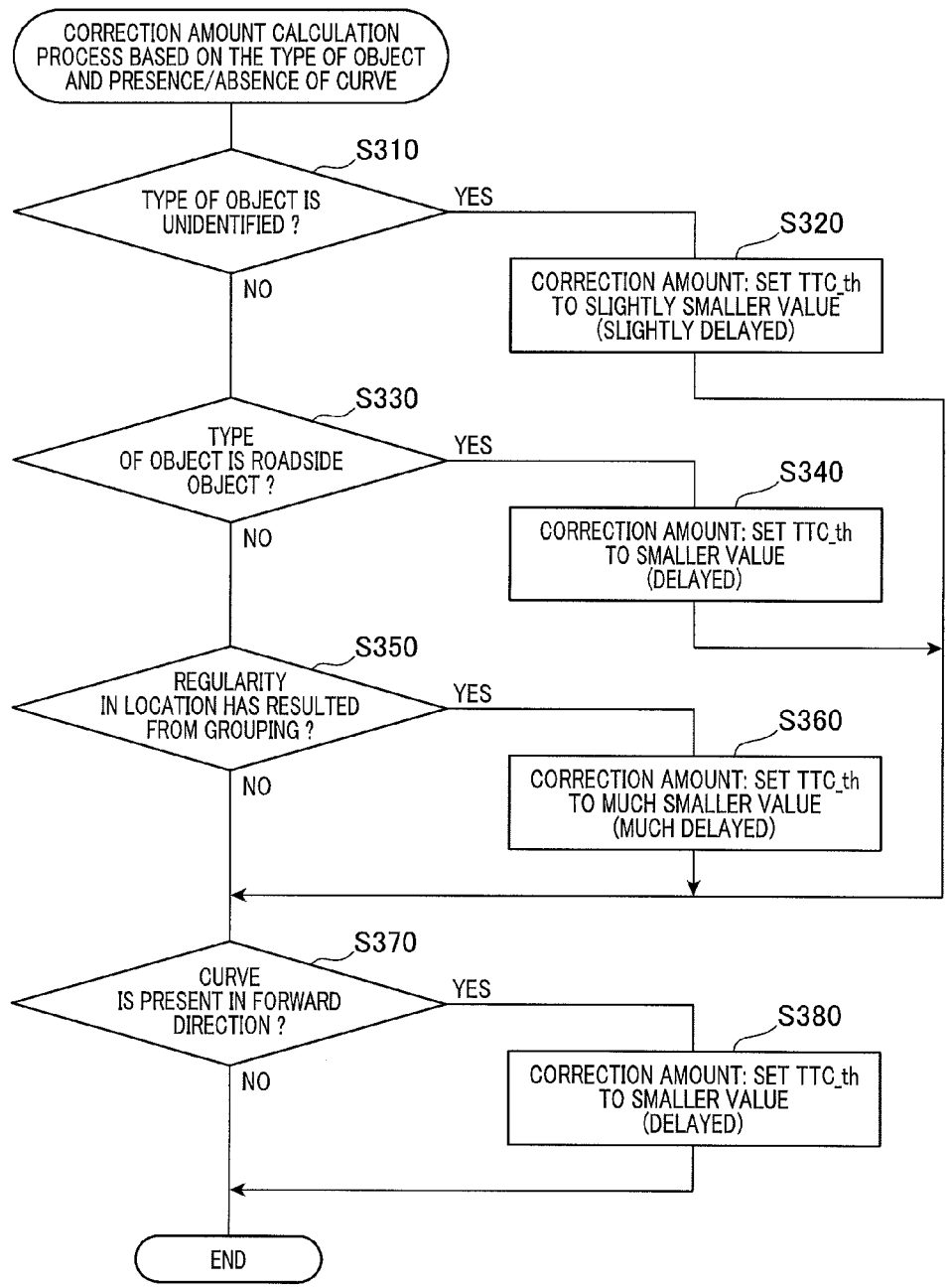
FIG. 4 is a flow diagram illustrating a correction amount calculation process based on the type of object and presence/absence of curve, in the collision mitigation process.

Referring to FIGS. 2 to 4, hereinafter is described the collision mitigation process that is a process performed in applying automatic braking. The collision mitigation process is performed at a predetermined period (e.g., of about 50 ms). FIG. 2 is a flow diagram illustrating the collision mitigation process performed by the CPU 11 of the collision mitigation controller 10. The steps on or after step S150 shown in FIG. 2 may be performed for each of the recognized objects (targets).

In the collision mitigation process shown in FIG. 2, the collision mitigation controller 10 acquires information regarding an object (step S110). At this step, the controller 10 acquires the latest position information (a plurality of coordinates) of an object, which is detected by the camera sensor 31 and the radar sensor 32.

Then, the controller 10 (type determining section) performs recognition of objects (step S120). In this step, the controller 10 recognizes the type of each object (vehicle, pedestrian, bicycle or motorbike) in accordance with the shape or the like of the object (e.g., by pattern matching), which is obtained from the camera sensor 31. Then, the controller 10 correlates an object recorded in the RAM 13 in the previous cycle or in the cycles preceding the previous cycle, with each object recognized in the present cycle. Further, in this step, the controller 10 also recognizes the behaviors of the objects and their positional relationship (coordinates of the objects with reference to the own vehicle) as well as speeds relative to the respective objects.

In a determination which is based on an image obtained from the camera sensor 31, the controller 10 classifies the type of each object in the image at least into a vehicle, a pedestrian, a two-wheel vehicle, a roadside object, or anything other than these (including an unidentified object).

Further, the controller 10 correctly specifies the positions of these objects on the basis of the coordinates of the objects obtained from the radar sensor 32. The shape of an object is highly accurate when specified based on an image obtained from the camera sensor 31, while the position of an object is highly accurate when specified based on the coordinates obtained from the radar sensor 32. In this way of specification, merits of these sensors are well made use of.

Then, the controller 10 (type determining section) recognizes the location of the objects using grouping (step S130). As mentioned above, a plurality of coordinates are obtained from the radar sensor 32. Some of these coordinates correspond to a continuous roadside object (a coordinate group regularly expressed as a line or a curve in a given range) which is based on a recognition of a series of targets that are present along the traveling direction of the own vehicle. In step S130, the controller 10 firstly deals with such a continuous roadside object as a group of series of targets and recognizes the group as one object.

FIG. 3 is an explanatory diagram illustrating a method of identifying the type of an object. For example, roadside objects, such as a guardrail or plantings (hedges), are arranged along a road. In this case, as shown in FIG. 3, a plurality of coordinates are regularly detected by the radar sensor 32. The plurality of regularly juxtaposed coordinates of not less than a specified value number (e.g., five) are grouped into a roadside object and dealt with as one object.

In the example shown in FIG. 3, a vehicle is present in the forward direction. The position (coordinates) of this vehicle is also detected by the radar sensor 32. However, the specified value number mentioned above is determined so that vehicles will not be grouped into a roadside object. In the present step (step S130), among the objects whose types have not been specified in the determination based on the image obtained from the camera sensor 31, those which are grouped into a roadside object are specified as a roadside object (a continuous roadside object located along the road) that is a type of an object in the classification.

Then, the controller 10 (road shape recognizing section) recognizes the shape of the road in the forward direction of the own vehicle (step S140). In this step, a well-known white line recognition technique, map information or the like is used to recognize, for example, whether the road on which the own vehicle travels is in a linear or curved shape, or whether or not there is a slope.

Then, the controller 10 (activation condition changing section) performs a correction amount calculation process based on the type of object and presence/absence of curve (step S150). In this step, the controller 10 sets a correction amount of an activation reference time TTC_th in accordance with the type of object or presence/absence of curve. The activation reference time TTC_th is a threshold for determining the timing of performing the control for avoiding collision between the own vehicle and an object. As the activation reference time TTC_th has a larger value, the timing of starting the collision avoiding control becomes earlier. As the activation reference time TTC_th has a smaller value, the timing of starting the collision avoiding control becomes later.

FIG. 4 is a flow diagram illustrating the correction amount calculation process. As shown in FIG. 4, in the correction amount calculation process based on the type of object and presence/absence of curve, the controller 10 determines first whether or not the type of an object is unidentified (step S310). If the type of the object is unidentified (YES in step S310), the controller 10 sets a correction amount to a value that allows the activation reference time TTC_th to have a slightly small value (e.g., −0.25 sec). Specifically, with this setting, the start of the collision avoiding control is slightly delayed (step S320). Then, control proceeds to step S370.

If the type of the object is not unidentified (NO in step S310), the controller 10 determines whether or not the type of the object is a roadside object (excepting a continuous roadside object) (step S330). If the type of the object is a roadside object (YES in step S330), the controller 10 sets the correction amount to a value that allows the activation reference time TTC_th to have a smaller value (e.g., −0.5 sec) than in the case where the type of the object is unidentified. Specifically, with this setting, the start of the collision avoiding control is delayed (step S340). Then, control proceeds to step S370.

If the type of the object is not a roadside object (NO in step S330), the controller 10 determines whether or not a continuous roadside object has been detected as a result of grouping (step S350). If a continuous roadside object has been detected (YES in step S350), the controller 10 sets the correction amount to a value that allows the activation reference time TTC_th to have a smaller value (e.g., −0.75 sec) (much more delayed) than in the case where the type of the object is a roadside object that is not a continuous roadside object (step S360).

When step S360 is completed, or if a continuous roadside object has not been detected in step S350 (NO in step S350), the controller 10 determines whether or not there is a curve in the forward direction (step S370). If there is a curve in the forward direction (YES in step S370), the controller 10 sets the correction amount to a value that allows the activation reference time TTC_th to have a smaller value (e.g., −0.5 sec) (step S380). In this step, a new correction value may be integrated into the correction value set in step S320, S340 or S360, or alternatively, any one of the correction values (e.g., maximum of the correction values) may be used as a correction value.

When step. S380 is completed, or if no curve is determined to be present in the forward direction in step S370 (NO in step S370), the correction amount calculation process based on the type of object and presence/absence of curve is terminated.

Back to FIG. 2 again, in step S160, the activation reference time TTC_th is calculated. The activation reference time TTC_th in this step may be optionally set, for example, on a vehicle type basis. In any case, for example, the activation reference time TTC_th is set to the timing that may or may not enable avoidance of collision when the driver has immediately performed a collision avoiding manipulation.

Then, the controller 10 applies a correction amount to the activation reference time TTC_th to perform correction (step S170). In this step, the controller 10 adds a section correction amount to the activation reference time TTC_th that has been set in step S160 and obtains a new activation reference time TTC_th.

Then, the controller 10 calculates a collision time TTC that expresses a time until the occurrence of a collision between the own vehicle and an object (step S210). Then, the collision time TIC is compared with the activation reference time TTC_th (step S220).

If the collision time TTC is less than the activation reference time TTC_th (NO in step S220), the controller 10 creates an automatic braking application instruction indicating application of braking (i.e. sets up a flag in the RAM 13) (step S230). Then, the controller 10 (activation control section) carries out an activation control process (step S250). In the activation control process, the controller 10 transmits an activation command to the controlled object 40, the command being suitable for the controlled object 40, on the basis of the created automatic braking application instruction (flag) (when there are several controlled objects 40, the activation command is transmitted to each of them).

If the collision time TTC is equal to or more than the activation reference time TTC_th (YES in step S220), the controller 10 provides a setting that will not create an automatic braking application instruction (i.e. resets the flag in the RAM 13) (step S240). Then, the above activation control process is performed (step S250).

After performing the series of steps, the collision mitigation process is halted until the next iteration.

(Advantageous Effects of the Present Embodiment)

In the PCS 1 specifically described above, the collision mitigation controller 10 detects objects positioned around the own vehicle. When the positional relationship between the own vehicle and an object meets a predetermined activation condition, the controller 10 activates the controlled object 40 to mitigate the damage to the own vehicle in the occurrence of a collision. Further, the controller 10 determines the type of an object, the type being any one of a vehicle, a pedestrian and a roadside object. If the type of the object is a roadside object, the activation condition is consolidated (i.e. strictly set) compared to the case where the type of the object is not a roadside object.

According to the PCS 1, when the type of an object is a roadside object, the activation timing of the controlled object 40 can be set so as to be delayed compared to the case where the object does not correspond to any one of a vehicle, a pedestrian or a roadside object. Accordingly, when the object is anything but a roadside object, necessary control is ensured to be started at an earlier stage, while unnecessary control is ensured to be suppressed when the object is a roadside object. The expression that the activation reference time TTC_th is "consolidated" refers to that the activation reference time TTC_th is set such that the controlled object 40 is unlikely to be activated.

In the PCS 1 described above, the collision mitigation controller 10 compares the collision time (TTC) up to the occurrence of a collision between the own vehicle and an object, with the activation reference time (TTC_th) which is preset as a timing for performing the control for avoiding a collision between the own vehicle and an object. Then, according to the results of the comparison, the controller 10 determines whether or not the controlled object 40 should be activated. If the type of the object is a roadside object, the controller 10 sets the activation reference time to a smaller value than in the case where the type of the object is not a roadside object.

According to the PCS 1, a simple configuration of setting the activation reference time to a smaller value can realize a configuration for suppressing the activation of the controlled object 40.

Further, in the PCS 1, the collision mitigation controller 10 also determines that an object does not correspond to any one of a vehicle, a pedestrian or a roadside object. If the type of the object is a roadside object, the controller 10 consolidates the activation condition, compared to the case where the type of the object is not available.

Specifically, the controller 10 determines there is less necessity for the controlled object 40 to be activated when the type of the object is a roadside object, than when the type of the object is not available (e.g., when the type of the object is unidentified). According to the PCS 1, the controlled object 40 can be more appropriately activated.

In the PCS 1, when an object is a roadside object, the collision mitigation controller 10 also determines whether or not the roadside object is a continuous roadside object which is based on a recognition of a series of targets that are present along the traveling direction of the own vehicle. If the type of the object is a continuous roadside object, the controller 10 further consolidates the activation condition than in the case where the type of the object is a roadside object that is not a continuous roadside object.

Specifically, when an object is a continuous roadside object, such as a guardrail or a series of plantings, it is natural for the own vehicle to travel close to the continuous roadside object. Therefore, the controller 10 is less likely to allow the controlled object 40 to be activated. According to the PCS 1, the controlled object 40 can be more appropriately activated according to the actual traveling conditions.

Further, in the PCS 1, the collision mitigation controller 10 recognizes the shape of the rode on which the own vehicle travels. Then, when the road is in a curved shape, the activation condition is consolidated.

According to the PCS 1, when the road is in a curved shape, the own vehicle could happen to travel toward a roadside object, such as a guardrail. However, in this case, since the own vehicle has a high probability of traveling along the shape of the road, the controller 10 consolidates the activation condition and provides a setting so that the controlled object 40 is unlikely to be activated. In this way, unnecessary control is suppressed from being performed.

(Other Embodiments)

The present invention shall not be construed as being limited to the foregoing embodiment. For example, in some mode, a part of the configuration of the foregoing embodiment may be omitted as far as the problem set forth above is solved. This mode is also included in the embodiments of the present invention. Further, the above embodiments may be appropriately combined to provide a configuration as a different mode which is also included in the embodiments of the present invention. In addition, any mode that can be conceived of without departing from the essentials of the invention that are only defined by the terms and expressions in the claims is also included in the embodiments of the present invention.

For example, in the foregoing embodiment, the camera sensor 31 and the radar sensor 32 are used in combination to provide a configuration in which the accuracy of recognizing an object is enhanced. However, a configuration that includes either the camera sensor 31 or the radar sensor 32 may be provided to realize a part of the present invention.

In the foregoing embodiment, the activation reference time TTC_th is used as the activation condition and the activation reference time TTC_th is changed. However, for example, a threshold of collision probability may be used as the activation condition and the collision probability may be changed.

According to the above modifications as well, the advantageous effects similar to those of the foregoing embodiment can be obtained.

The PCS 1 in the foregoing embodiment corresponds to the collision mitigation apparatus. Similarly, the controlled object 40 corresponds to the collision mitigation part (unit). Further, steps S220 to S250 of the collision mitigation process in the foregoing embodiment correspond to an activation control means (section). Similarly, steps S120 and S130 correspond to a type determining means (section).

Further, step S140 in the foregoing embodiment corresponds to a road shape recognizing means (section). Similarly, step S150 corresponds to an activation condition changing means (section).

Hereinafter, aspects of the above-described embodiments will be summarized.

In the collision mitigation apparatus, the activation control section detects an object positioned around the vehicle, and activates a collision mitigation part (controlled object 40) for mitigating damage to the vehicle in occurrence of a collision if a positional relationship between the vehicle and the object meets a predetermined activation condition. In addition, the type determining section determines type of the object, the type being any one of a vehicle, a pedestrian and a roadside object. The activation condition changing section consolidates (i.e. strictly set) the activation condition compared to a case where the type of the object is not a roadside object, if the type of the object is a roadside object.

According to the collision mitigation apparatus, activation timing can be set so as to be delayed when the type of an object is a roadside object, compared to the case where the type of an object is a vehicle or a pedestrian. Accordingly, the apparatus is ensured to perform necessary control at an earlier stage when the object is anything but a roadside object, while ensuring to suppress unnecessary control when the object is a roadside object.

In order to achieve the above object, a computer may execute a collision mitigation apparatus program that realizes various means configuring the collision mitigation apparatus.

What is claimed is:

1. A collision mitigation apparatus, which is installed in a vehicle and mitigates damage to the vehicle in occurrence of a collision, comprising:
   a collision mitigation controller that detects an object positioned around the vehicle, that activates a collision mitigation part for mitigating damage to the vehicle in occurrence of a collision if a positional relationship between the vehicle and the object meets a predetermined activation condition,
   that determines a type of the object, the type being any one of a vehicle, a pedestrian and a roadside object, and
   that strictly sets the activation condition compared to a case where the type of the object is not a roadside object, if the type of the object is a roadside object, wherein
   in a case where the type of the object is the roadside object, the collision mitigation controller determines whether or not the roadside object is a continuous roadside object based on recognition of a series of targets that are present along a traveling direction of the vehicle, and
   in a case where the roadside object is the continuous roadside object, the collision mitigation controller sets the activation condition more strictly than in a case where the roadside object that is not the continuous roadside object.

2. The collision mitigation apparatus according to claim 1, wherein
   the collision mitigation controller compares a collision time up to occurrence of a collision between the vehicle and the object, with an activation reference time which is preset as a timing for performing control for avoiding a collision between the vehicle and the object, and determines, according to the result of the comparison, whether or not the collision mitigation part should be activated, and
   in the case where the type of the object is the roadside object, the collision mitigation controller sets the activation reference time to a smaller value than in the case where the type of the object is not the roadside object.

3. The collision mitigation apparatus according to claim 1, wherein
   the collision mitigation controller determines that the object does not correspond to any one of a vehicle, a pedestrian and a roadside object, and
   in the case where the type of the object is the roadside object, the collision mitigation controller strictly sets the activation condition compared to a case where the type of the object is not available.

4. The collision mitigation apparatus according to claim 1, wherein the collision mitigation controller recognizes a shape of a road on which the vehicle travels,
   and strictly sets the activation condition if the road is in a curved shape.

\* \* \* \* \*